Sept. 21, 1965 R. B. LAWRENCE 3,207,536
COUPLING HAVING PIN AND FINGER
CLAMPING MEANS WITH LOCK
Filed March 26, 1963 2 Sheets-Sheet 2

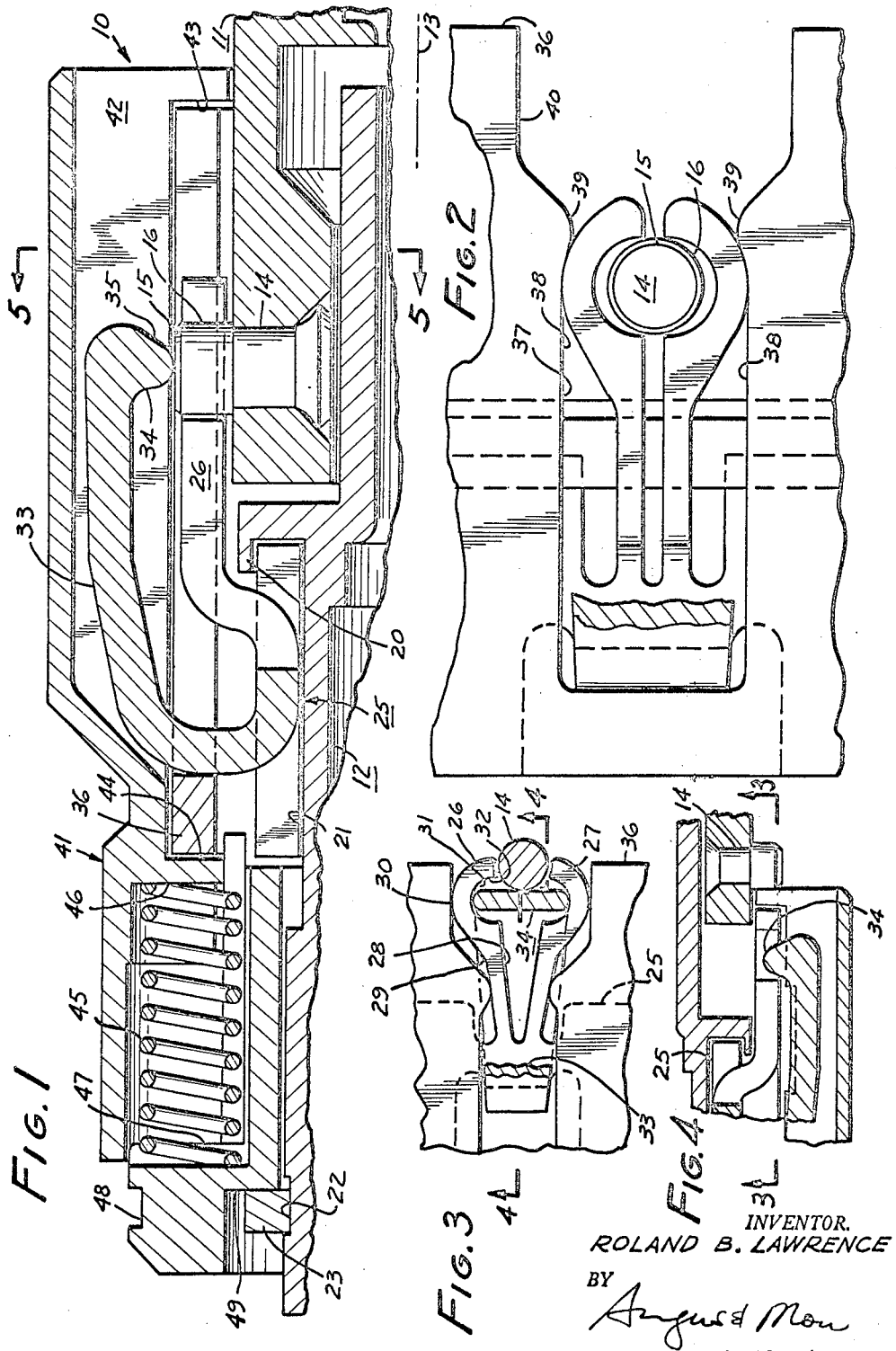

INVENTOR.
ROLAND B. LAWRENCE
BY
ATTORNEYS.

3,207,536
COUPLING HAVING PIN AND FINGER
CLAMPING MEANS WITH LOCK
Roland B. Lawrence, Banning, Calif., assignor to The
Deutsch Company, Electronic Components Division,
Banning, Calif., a corporation of California
Filed Mar. 26, 1963, Ser. No. 268,124
5 Claims. (Cl. 285—308)

This invention relates to a releasable lock for preventing the separation of two bodies along an axis. It finds its principal application in the joining of two bodies, such as a pair of housings for electrical connectors wherein, after the connector housings are joined, it is desired to hold them against separation.

It is an object of this invention to provide a bayonet-type lock which is adapted to join two bodies, and which is inherently ready to accept a locking pin, and which can conveniently be locked so as to hold the pin against release, thereby to hold the coupling joined.

A releasable lock according to this invention comprises a pin attached to one of the bodies and a clamp attached to the second of the bodies. The clamp includes a pair of arms, each attached by one of its ends to the second body and extending in the same general axial direction. These arms have free ends and an inside and an outside surface. The inside surfaces face each other, and the outside surfaces are on the opposite sides of the pair of arms. A shoulder is formed on each inside surface adjacent to the free end, each inside surface thereby forming a relief bounded by one end by its respective shoulder. The free ends are spaced apart when the arms are in the relaxed condition, and a tongue is adapted to stand between the inside surfaces to hold them further apart against resistance of the arms, thereby to enable the pin to enter between the free ends. The pin is adapted to force the tongue from between the arms.

A latch comprises a pair of spaced-apart surfaces adapted to straddle the arms and contact their outside surfaces in order to press the arms toward each other so that the shoulders embrace the pin to trap the same at one axial position of the latch, and to leave free the outside surfaces in another axial position.

According to a preferred but optional feature of the invention, each of the latch surfaces, and each outside surface of the arms includes an ear, the latch ears being adapted to snap over respective ears on the arms, thereby to hold the latch in an engagement position.

According to still another preferred but optional feature of the invention, the arms and latch are disposed on coaxial rings adapted to surround a cylindrical body in order that the bodies may be locked to each other.

The above and other features of this invention will be fully understood from the following detailed description and the accompanying drawings in which:

FIG. 1 is an axial cross-section showing a portion of the invention;

FIG. 2 is a plan view showing a fragment of FIG. 1;

Figure 5:
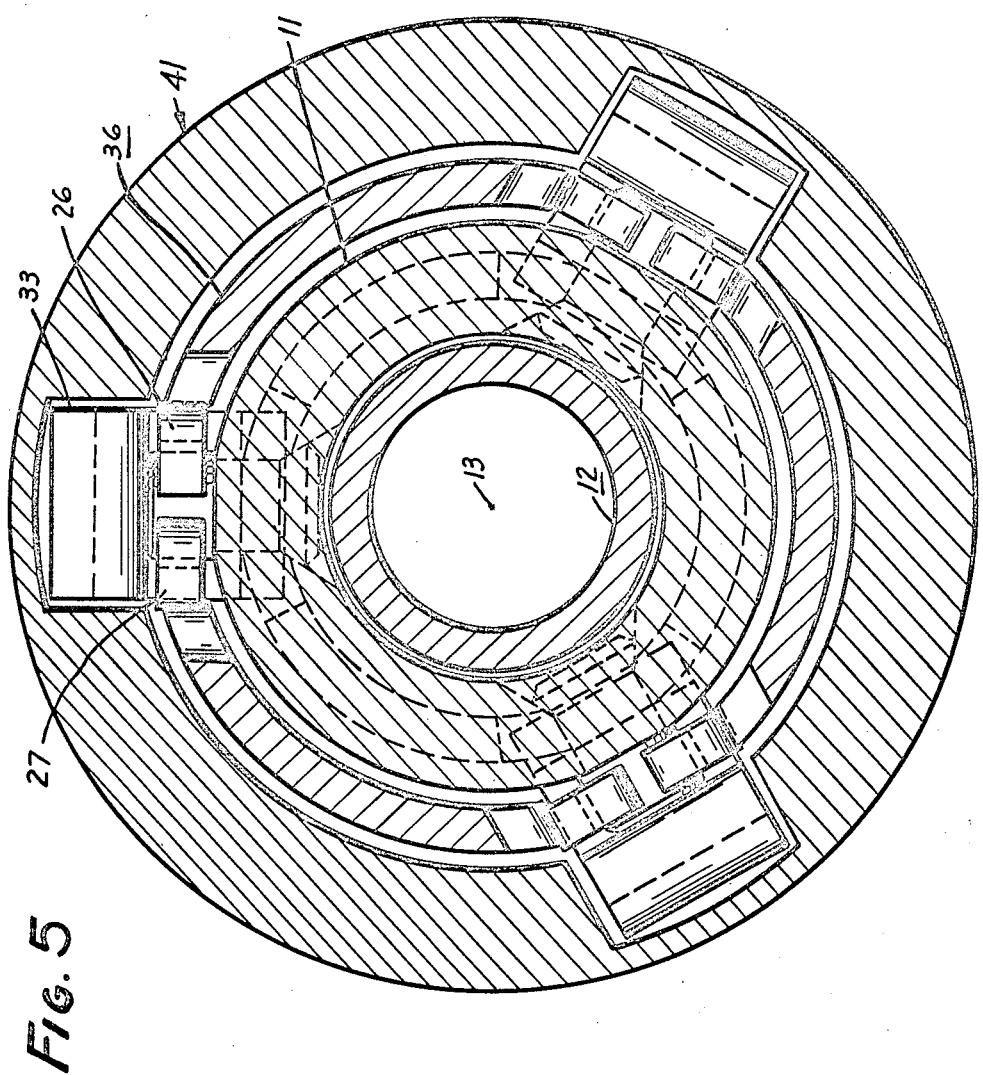

FIGS. 3 and 4 are cross-sections taken at lines 3—3 and 4—4 of FIGS. 4 and 3, respectively; and FIG. 5 is a cross-section taken at line 5—5 of FIG. 1.

The presently preferred embodiment of releasable lock 10 is shown in FIG. 1. Its objective is to lock together bodies 11, 12. These bodies may be such as housings for electrical couplings or the like, the nature of the bodies joined together being immaterial to the invention. They have a common axis 13 when joined.

A pin 14 is attached to first body 11. This pin has a chamfer 15 and a peripheral surface 16 intended to be embraced by the lock.

Body 12 includes an overhanging shoulder 20 adjacent to a groove 21. A ring groove 22 is formed axially to the left of groove 21 in FIG. 1. A retainer ring 23 snaps around the body and fits into groove 22.

A clamp ring 25 surrounds body 12 and fits in groove 21 underneath shoulder 20. Groove 21 is long enough to enable the ring to be slipped into the groove and under the shoulder. This ring with its clamps is conveniently formed from a piece of flat sheet metal and, after elements yet to be described are formed up, may be wrapped around body 12.

FIG. 3 shows additional details of clamp ring 25. This ring includes integral therewith a pair of arms 26, 27, each having an inside surface 28 and an outside surface 29, the inside surfaces facing each other, and the outside surfaces being on the outside of the pair of arms. Each of the outside surfaces includes an ear 30, which ears are curved extensions of the outer surface.

Each inside surface includes a relief 31, bounded in part by shoulder 32. The relief and shoulder are preferably arcuate in order to embrace the peripheral surface of the pin in one condition of the lock.

Also integral with the clamp ring is a tongue 33 which rises above the elevation of the arms and is sprung so that a portion of it tends to stand between them. The tongue includes a lip 34 for this purpose. The spring tension of the arms is such as to cause them to clamp closer together than the lip permits, so that the lip holds these surfaces apart to enable the pin to enter the region between the arms, unimpeded. The lip includes a cam surface 35 which faces the pin.

As can best be appreciated from an examination of FIG. 5, any number of these clamps can be provided on the clamp ring. In the embodiment shown, there are three sets, but there could be one or any number, as suitable for the specific installation.

A latch ring 36 also surrounds the second body and may be formed up from a flat strip and wrapped into a circular shape. The latch ring includes a recess 37 bounded at its sides by latch surfaces 38, each carrying an ear 39. There is one of these recesses for each set of clamp arms. To the right of the recess there is an enlarged portion bounded by surfaces 40 which leave the clamp arms sufficiently unimpeded that they will not interfere with the passage of the pin between the free ends of the arms.

A latch actuator 41 comprises a ring having a slot 42 to overhang the tongue, and an overhanging shoulder 43 to trap the latch ring. It includes an abutment surface 44 adapted to abut the left-hand edge of the latch ring to move it toward the right, the overhanging shoulder 43 serving to move it to the left, both in FIG. 1.

A spring 45 is compressed between a spring shoulder 46 on the latch actuator, and a shoulder 47 on a retainer 48. The retainer includes another shoulder 49 which abuts against the retainer ring 23 so that the assembly is held in place between the retainer ring and overhanging shoulder 20. Spring 45 tends to bias the latch actuator to the right in FIG. 1, where it is shown in the locking position with the two bodies joined.

FIG. 3 shows the clamp in its unlocked condition, with the latch ring moved to the left relative to FIG. 1 so that the ears do not overlap each other. The pin has been pulled away from the reliefs inside the arms. As the pin moves away from the position of FIG. 1, it spreads the arms (the latch having been released). The top of the cam surface of the tongue rides the top of the pin and down its chamfer, so that after the pin is moved away from the tongue, the tongue stands between the arms and holds them spread apart so that they can later receive the pin. The tongue reached this position before the pin left the region between the free ends of the arms.

When the devices are again joined, the clamp arms are held apart as in FIG. 3, and the pin may be moved in between them by moving the pin relatively to the left in FIG. 3. This will again cam the tongue out of the way and permit the pin to enter and stand between the two arms. At this time, the arms will snap together so that the shoulders embrace the right-hand side of the pin, thereby holding it trapped although not as yet latched. However, the device will be lightly held in the locked condition by virtue of the spring force of the arms, although a sufficient parting force will, of course, spread the arms. When the latch is moved to the right as shown in FIG. 2, and the ears have overlapped each other, the clamp arms are backed up by the latch surfaces, and the clamp arms cannot be undone without again shifting the latch. The device is then fully locked.

As can best be seen in FIG. 2, the depth of the recesses in the position shown is greater than the diameter of the pin in order that the clamp arms can move toward each other to give the ears clearance to move past each other. But the clamp arms will, in any position, remain available to lock the device, the normal position of the arms being only slightly more spread than shown in FIG. 2.

As can best be seen in FIG. 5, a plurality of these latching means may readily be provided, one or more being used as desired.

It will further be understood that the usefulness of this device is not restricted solely to cylindrical or tubular devices but can be used on any device wherein a relative axial motion is to be prevented. Flat slides furnish still another example wherein a single lock of the type shown in FIG. 1, with the clamp arms attached to one body, the pin to the other, and the latch slidable relative to one of them, can be used.

The device is convenient and simple to manufacture, and is inherently reliable, the clamps being held open by their own tongues, the tongues being held out of the way by the pin which the clamp embraces to lock, until the tongue is again used.

The latch ring may, if desired, be provided with means to secure it temporarily in the position indicated in FIG. 1, but this is not essential. Also, spring 45 may be omitted should it be desired to retain the latch ring away from an unactuated condition, but ordinarily this bias spring is preferred because of the certainty of actuation it provides.

This invention is not to be limited by the embodiment shown in the drawings and described in the description which is given by way of example and not of limitation, but only in accordance with the scope of the appended claims.

I claim:

1. A lockable coupling comprising: a first and a second tubular body, said bodies being coaxial and in a telescoped relation; and a releasable lock for preventing the separation of said two bodies along the axis, comprising a pin attached to a first of the bodies, an annular clamp ring circumscribing the second of said bodies, said clamp including a releasable lock having a pair of arms each attached at one of its ends to the second body and extending in the same general axial direction and toward said first body, said arms having free ends, and an inside and an outside surface, the inside surfaces facing each other, and the outside surfaces being on opposite sides of the pair of arms, a shoulder on each inside surface adjacent to the free end, each inside surface forming a relief bounded at one end by its respective shoulder, the free ends being spaced apart when the arms are in their relaxed condition, and a tongue adapted to stand between the inside surfaces and hold them apart against resistance of the arms thereby to enable the pin to enter between the free ends, the pin being adapted to force the tongue from between the arms, and an axially movable latch comprising a pair of spaced-apart surfaces adapted to straddle the arms and contact their outside surfaces in order to press the arms toward each other so that the shoulders embrace the pin to trap the same at one axial position of the latch, and to leave free the outside surfaces in another axial position.

2. A releasable lock according to claim 1 in which each of the latch surfaces and each outside surface includes an ear, said ears of said latch surfaces extending inwardly toward said arms, and said ears of said outside surfaces extending outwardly toward said latch surfaces, the latch ears being adapted to snap over respective other ears thereby to hold the latch in an engaged position.

3. A releasable lock according to claim 1 in which the tongue includes a lip adapted to enter between the arms, and a cam section on said lip facing toward the pin adapted to be contacted by the pin, thereby to force the tongue from between the arms.

4. A releasable lock according to claim 1 in which the arms and latch are disposed on coaxial rings circumscribing one of said tubular bodies, the pin being attached to the other tubular body and projecting substantially radially therefrom to a position between said arms and in said relief for thereby preventing a separation of said bodies.

5. A releasable lock according to claim 1 in which a plurality of pairs of arms and latches is provided at angularly spaced-apart intervals on coaxial rings adapted to surround a cylindrical body, and in which an equal number of pins is attached to another cylindrical body at equal angular intervals, thereby providing a plural-member lock for holding the bodies together.

References Cited by the Examiner

UNITED STATES PATENTS

| | | | |
|---|---|---|---|
| 1,143,873 | 6/15 | Wingerd | 280—509 |
| 1,665,817 | 4/28 | Morton | 280—509 |
| 1,782,115 | 11/30 | Cadman | 280—428 |
| 1,806,191 | 5/31 | Cadman | 280—428 |
| 2,294,710 | 9/42 | Berg | 280—432 |
| 2,853,312 | 9/58 | Fuschi | 280—432 |

CARL W. TOMLIN, *Primary Examiner.*